Feb. 28, 1928. 1,660,439
E. E. GREVE
ELECTRIC DIFFERENTIAL DRIVE FOR DRILLING MACHINERY
Filed July 8, 1924
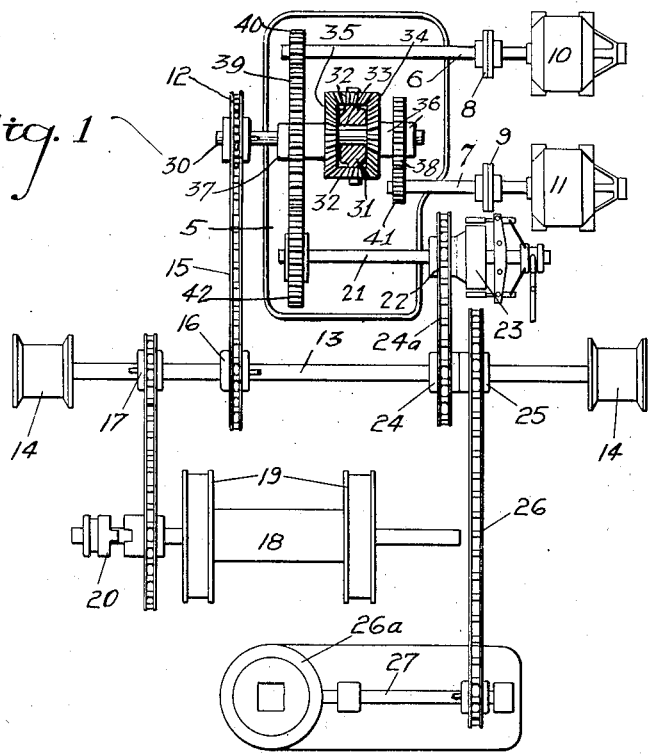
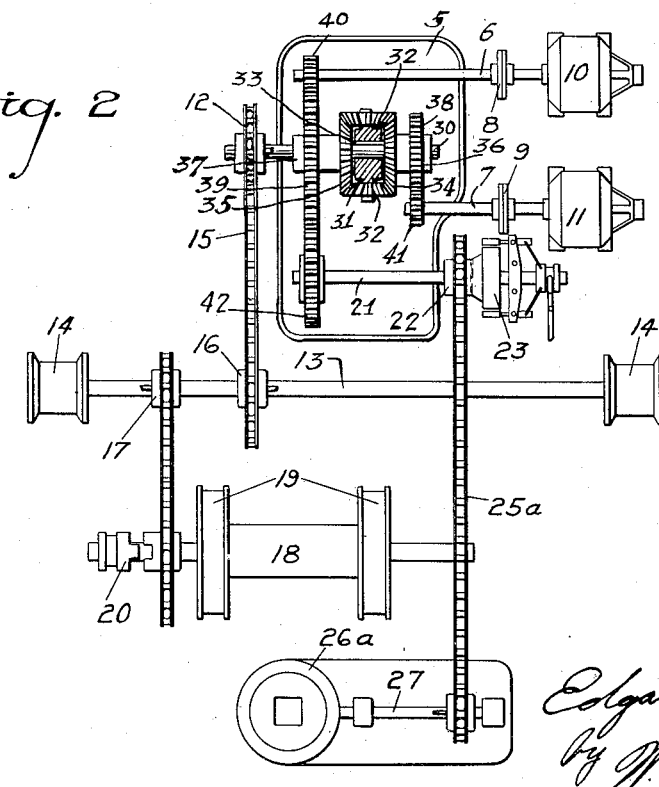
INVENTOR
Edgar E. Greve
by W. P. Doolittle
his attorney.

Patented Feb. 28, 1928.

1,660,439

UNITED STATES PATENT OFFICE.

EDGAR E. GREVE, OF BELLEVUE, PENNSYLVANIA.

ELECTRIC DIFFERENTIAL DRIVE FOR DRILLING MACHINERY.

Application filed July 8, 1924. Serial No. 724,781.

This invention relates to earth drilling mechanism, and particularly to an improvement in driving mechanism for the drilling machinery, wherein electric motors and a differential gearing are employed for controlling the action of the drill bit.

As heretofore made, this differential mechanism has been so designed as to render it inapplicable to standard drilling rigs.

The present invention has for its object to provide for the utilization of such differential drive with standard rigs, particularly rotary drilling rigs.

By way of explanation, it may be stated that the invention is particularly adapted for use with what is known in the art as the "Hild universal electric drive for oil wells".

In the Hild system, two motors are connected with a differential gear in such manner that the pressure of the bit, or the feed of the bit, is automatically controlled. If the resistance of the bit is too great, for instance, it will be automatically raised. If a soft formation is encountered, it will be lowered as fast as the bit may work the formation. The general principle of operation is that of any differential gear. The motors are run at substantially constant speeds and also in opposite directions, and the differential is transmitted to the rotary hoist. As the load on one or the other of the motors is increased or decreased, the hoist will be properly rotated in one direction or the other, to slightly raise or lower the bit.

The present invention may be readily understood by reference to the accompanying drawings, which are generally diagrammatic, and in which:

Fig. 1 is a top plan view of a standard drilling mechanism utilizing the differential drive; and Fig. 2 is a slight modification of the construction shown in Fig. 1.

In the drawings, 5 designates the differential gear box, from which extend two driving shafts 6 and 7, connected through couplings 8 and 9, respectively, with motors 10 and 11. The motion transmitted by the two motors which run in opposite directions, resolves itself, through differential gearing of standard design, not shown, into the rotation of sprocket wheel 12, whereby this wheel is rotated in either one direction or the other at varying speeds, depending on the differential speeds.

So much of the mechanism as has been described is used in the Hild system, and constitutes no part of the present invention.

According to my invention, the usual line shaft 13 is provided, having cat-heads 14 thereon. This line shaft is driven through chain 15 and sprocket 16 on the shaft from sprocket 12. A sprocket 17 on the line shaft drives the usual hoist drum 18, having the usual flanges 19, through clutch 20.

According to my invention, I propose to provide, in connection with the differential gear, a shaft 21 which will be driven at a substantially constant speed. This shaft carries a loose sprocket gear wheel 22, and motion is transferred from the shaft to the sprocket through a friction clutch 23.

As illustrated in Fig. 1, this sprocket 22 drives a loose sprocket 24 on the line shaft 13, through chain 24ª. Coupled with the sprocket 24 is a sprocket 25 that is also loose on the line shaft. A chain 26, engaging this sprocket, drives a drilling rotary 26ª through the usual drive shaft 27.

In Fig. 2, the rotary drive 27 is directly connected through chain 25ª with sprocket wheel 22, instead of through the intermediate gearing, as shown in Fig. 1. The advantage of the intermediate gears resides in the fact that the line shaft is usually above the derrick floor in practice, while the drive and rotary are both close to the floor. By driving through gears on the line shaft, the chain is elevated clear of the floor.

The particular advantage of the friction clutch 23, which may be of any well known or preferred construction, is that it enables a slippage to occur between the rotary and the driving mechanism to prevent the twisting off of a drill string, and a subsequent fishing operation, should the motors of the differential drive fail to function just as they should. This clutch also enables the differential to be driven to operate the hoisting drum or line shaft without driving the chains to the rotary. This enables the drum or cat-heads to be revolved at comparatively high speeds without liability of causing the chain 26 or 25ª to leave its sprockets.

From the foregoing, it will be understood that the hoist and line shaft may be organized in accordance with standard practice, a differential electric control for the hoist utilized, and the rotary suitably driven without the installation of secondary line shafts, or requiring the use of a line shaft with a plurality of clutches thereon.

The differential gearing preferably employed and as illustrated, is designed to be coupled up with the motors 10 and 11 through shafts 6 and 7 and coupling members 8 and 9. As shown, 30 designates the main shaft of the gearing; this shaft carries sprocket 12 thereon. Secured to shaft 30 by a key 33 and adapted to revolve therewith is a spider 31 having a plurality of arms each provided with a pinion gear 32 adapted to mesh with bevel gears 34 and 35, the latter being carried on hubs 36 and 37 respectively, loosely mounted on the shaft 30. 38 and 39 designate gear wheels fixed to and rotatable with the respective hubs 36 and 37. Located on the inner ends of shafts 6 and 7 and adapted to mesh with the gear wheels 39 and 38, I provide driving pinions 40 and 41. Disposed on the inner end of shaft 21 and adapted to engage gear 39 is a spur gear 42.

I claim as my invention:

1. The combination with a drilling rig including a rotary, a line shaft and a hoist, and plural driving means coupled together into a common differential gear unit to drive the rotary and the line shaft in synchronism or variably and in opposition, a friction clutch being interposed between the driving unit and the rotary acting on the rotary drive without affecting the hoist drive.

2. The combination with an oil well rig including a rotary, of a differential drive for rotary drilling apparatus comprising a standard differential gearing having two motors associated therewith and a hoist driving sprocket into which the differential motion is resolved, and a second frictionally driven sprocket unresponsive to the differential motion for driving the rotary.

3. A drilling rig including a hoist and a rotary, a pair of driving motors, a differential gear associated therewith, means connected with the hoist operated by the differential motion of the two motors for controlling the hoist, and means including gearing independent of the differential and a friction clutch for transmitting motion from one of the motors to the rotary.

4. The combination with an electric differential driving gear for drilling hoists, a pair of electric driving motors therefor, a hoist operating sprocket driven thereby according to the differential movements of the motors, a rotary, means for driving the rotary including a shaft associated with the driving gear and unresponsive to differential movements, a sprocket on the shaft, and a friction clutch interposed between the sprocket and the shaft.

5. Drilling apparatus including a rotary, a line shaft, a sprocket loose on the line shaft, a chain for operating the rotary from the said loose sprocket, a second loose sprocket for driving the first, a power plant having a variably and a non-variably driven sprocket, a chain connecting the said second sprocket with the said non-variably driven sprocket, a friction clutch cooperating with the non-variably driven sprocket, means for driving the line shaft from the variably driven sprocket, and a hoist operated from the line shaft.

6. Drilling apparatus including a rotary, a line shaft, a sprocket loose on the line shaft, a chain for operating the rotary from the said loose sprocket, a second loose sprocket for driving the first, a power plant having a variably and a non-variably driven sprocket, a friction clutch associated with the non-variably driven sprocket, a chain connecting the said second sprocket with said non-variably driven sprocket, means for driving the line shaft from the variably driven sprocket, and a hoist operated from the line shaft.

In testimony whereof I affix my signature.

EDGAR E. GREVE.